(12) United States Patent
Benson

(10) Patent No.: US 7,068,073 B2
(45) Date of Patent: Jun. 27, 2006

(54) CIRCUIT FOR SWITCHING ONE OR MORE HVD TRANSCEIVERS

(75) Inventor: Anthony J Benson, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 924 days.

(21) Appl. No.: 09/811,192

(22) Filed: Mar. 17, 2001

(65) Prior Publication Data

US 2002/0132588 A1 Sep. 19, 2002

(51) Int. Cl.
*H03K 19/0175* (2006.01)

(52) U.S. Cl. .......................................... 326/63; 326/33
(58) Field of Classification Search ............. 326/63–65, 326/68, 80, 82, 31, 33
See application file for complete search history.

(56) References Cited

U.S. PATENT DOCUMENTS

| 5,243,623 | A | * | 9/1993 | Murdock | 375/220 |
| 5,329,184 | A | * | 7/1994 | Redfern | 326/66 |
| 5,715,409 | A | * | 2/1998 | Bucher et al. | 710/62 |
| 6,529,036 | B1 | * | 3/2003 | Rai | 326/30 |

FOREIGN PATENT DOCUMENTS

DE    0 948 170 A2 * 10/1999

* cited by examiner

*Primary Examiner*—James H. Cho

(57) ABSTRACT

The output of an open-collector comparator and a programmable logic device are connected to a high voltage differential device. In conjunction with the comparator output, the programmable logic device controls the diffsense prime signal sent to the high voltage differential device in order to switch it on or off.

16 Claims, 2 Drawing Sheets

CIRCUIT FOR SWITCHING ONE OR MORE HVD TRANSCEIVERS

CROSS-REFERENCE

The present invention is related to subject matter disclosed in the following copending patent applications:

The present invention is related to subject matter disclosed in the following copending patent applications:

U.S. Pat. No. 6,757,774 entitled, "High-Availability, Highly-Redundant Storage System Enclosure", naming Anthony J. Benson and James J. deBlanc as inventors and filed on even date herewith;

U.S. Pat. No. 6,668,294 entitled, "Data Corruption Avoidance on a Backplane Bus Adapted to Receive Bus Controller Cards of Different Types", naming Anthony J. Benson and Patrick McGoey as inventors and filed on even date herewith;

U.S. Pat. No. 6,748,477 entitled, "Multiple-Path Interface Card for Interfacing Multiple Isolated Interfaces to a Storage System", naming Anthony J. Benson and James J. deBlanc as inventors and filed on even date herewith;

U.S. Pat. No. 6,789,151 entitled, "DIP Switch Configuration for Increased Usability with Multiple Cards", naming Anthony J. Benson, Chadi Theodossy, and Joanna Baisdan as inventors and filed on even date herewith;

U.S. Pat. No. 6,715,019 entitled, "Bus Reset Management by a Primary Controller Card of Multiple Controller Cards", naming Anthony J. Benson, James L. White, and Dovard K. Howard as inventors and filed on even data herewith; and U.S. Pat. No. 6,675,242 entitled, "Communication Bus Controller Including Designation of Primary and Secondary Status According to Slot Position", naming Anthony J. Benson, James L. White, and Dovard K. Howard as inventors and filed on even date herewith.

FIELD OF THE INVENTION

This invention relates to bus control, and more particularly to controlling one or more transceivers connected to a SCSI bus.

BACKGROUND

Mass storage units are commonly used in applications where large amounts of data need to be stored. Typically, such mass storage units each contain a number of disk drives connected via a bus, such as a differential Small Computer System Interface (SCSI) bus that is standard in the art. Such mass storage units typically include one or more bus controller cards to control the bus. Those one or more cards generally connect to a backplane on which the bus is implemented.

The bus controller card or cards may include high-voltage differential (HVD) transceivers. HVD transceivers are adapted for use with a differential SCSI bus carrying HVD signals at +5V, as defined in the SCSI-2 standard. A differential SCSI bus typically carries a diffsense signal that is used to characterize the bus. The voltage of the diffsense signal is associated with the type of SCSI bus in use. A diffsense voltage between 0 and 0.5 V is associated with a single-ended bus; a diffsense voltage between 0.7 and 1.9 V is associated with a low-voltage differential (LVD) bus; and a diffsense voltage of 2.4 V or greater is associated with an HVD bus. The diffsense signal is used to sense the type of bus signals utilized, and to switch devices connected to the bus on or off depending on the type of bus signals. Thus, those devices are protected from bus signals with which they are incompatible. However, sensing and acting on the diffsense signal alone do not protect the devices connected to the SCSI bus from other hazards.

SUMMARY

A programmable logic device is used in conjunction with a comparator to switch a high-voltage differential (HVD) transceiver on or off.

In one aspect of the invention, a comparator is configured in open-collector form. One terminal of a pullup resistor is electrically connected to the output of the comparator, an HVD transceiver, and an interface of a programmable logic device. The other terminal of the pullup resistor is electrically connected to a voltage source. The programmable logic device includes a tri-state buffer connected to the interface and control logic connected to the tri-state buffer, where that logic controls the tri-state buffer. External signals may be applied to the control logic, such that the control logic can switch the tri-state buffer in response to bus conditions or other external conditions. The interface of the programmable logic device may also be electrically connected to activation logic. The activation logic may assert signals out of the programmable logic device.

In another aspect of the invention, the HVD transceiver receives a diffsense prime signal and switches on or off based on that diffsense prime signal. Application of a diffsense signal to the comparator drives the comparator output to a zero-current state. The voltage source is set at logic high, so a high diffsense prime signal is applied to the HVD transceiver via the pullup receiver, activating the HVD transceiver. If the diffsense signal applied to the comparator is not within the voltage range of diffsense signals associated with an HVD SCSI bus, the comparator output is low, generating a low diffsense prime signal that is applied to the HVD transceiver, deactivating it. The programmable logic device can drive logic low at the HVD transceiver by enabling the tri-state buffer, giving the programmable logic device a degree of control over the HVD transceiver using an existing signal. By allowing the logic device to manipulate the diffsense prime signal, the usefulness of the diffsense prime signal for HVD transceiver control is expanded.

The invention will be more fully understood upon consideration of the detailed description below, taken together with the accompanying drawings.

BRIEF DESCRIPTION OF THE DRAWINGS

Use of the same reference symbols in different Figures indicates similar or identical items.

DETAILED DESCRIPTION

Figure 1:
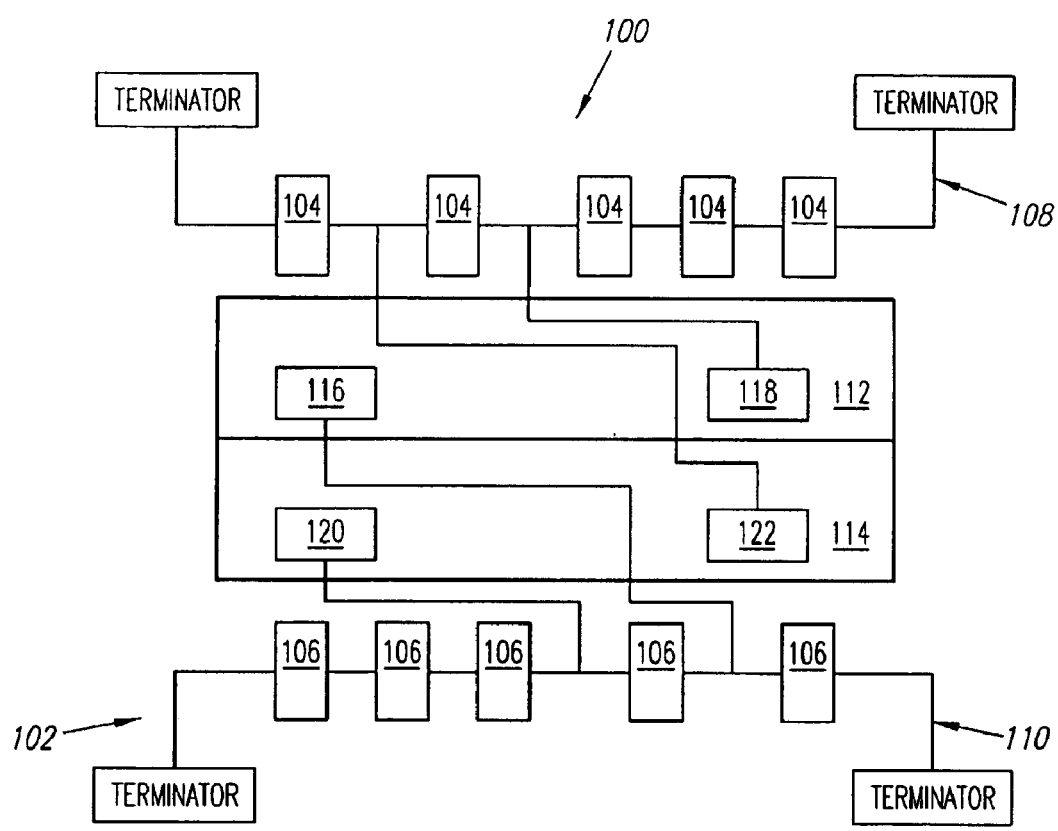
FIG. 1 is a schematic view of a backplane having a SCSI bus divided into a group of even ports and a group of odd ports, and two slots for receiving bus controller cards.

Referring to FIG. 1, a schematic of a backplane 100 is shown. The backplane 100 is preferably a printed circuit board that may be utilized as a component within another assembly, such as a mass storage unit. A first bus 108 and a second bus 110 are implemented on the backplane 100, preferably as standard SCSI buses. However, the buses 108, 110 each may be another type of bus, if desired. The first bus 108 preferably includes a number of ports 104, each preferably having the same physical configuration. The ports 104 each are adapted to connect to a peripheral device, such as a disk drive. The second bus 110 preferably includes a number of ports 106, each preferably having the same physical configuration. The ports 106 each are adapted to connect to a peripheral device, such as a disk drive.

A first bus controller slot 112 and a second bus controller slot 114 are preferably included on the backplane 100. The first bus controller slot 112 preferably includes a first connector 116 electrically connected to the second bus 110, and a second connector 118 electrically connected to the first bus 108. The second bus controller slot 114 preferably includes a first connector 120 electrically connected to the second bus 110, and a second connector 122 electrically connected to the first bus 108. The connectors 116, 118 in the first bus controller slot 112 are physically and electrically configured to receive a bus controller card. The connectors 120, 122 in the second bus controller slot 114 are also physically and electrically configured to receive a similar or identical bus controller card. Preferably, the first bus 108 and the second bus 110 are connected only through one or more bus controller cards inserted into the first bus controller slot 112 and/or the second bus controller slot 114. That is, the first bus 108 is separated physically and electrically from the second bus 110, such that the only connection or connections between the two partitions 108, 110 are made via one or more bus controller cards.

Figure 2:
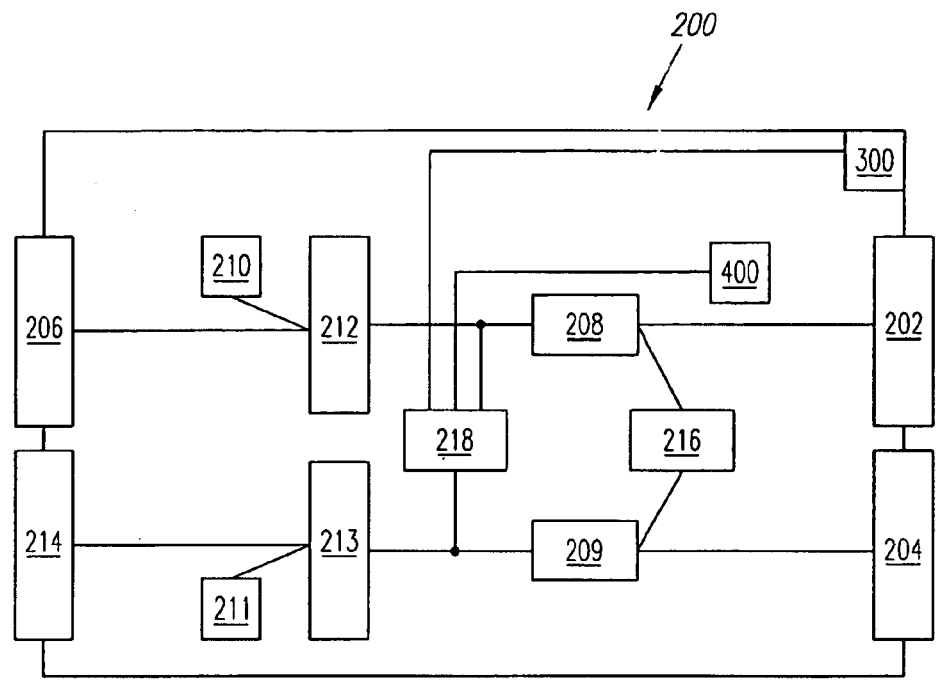
FIG. 2 is a schematic view of a bus controller card.

Referring as well to FIG. 2, a schematic of a bus controller card 200 is shown. Preferably, the bus controller card 200 is physically and electrically adapted to be received by either the first bus controller slot 112 or the second bus controller slot 114. The bus controller card 200 includes a first backplane connector 202 and a second backplane connector 204, physically and electrically adapted to interface with the connectors 116, 118 in the first bus controller slot 112, or the connectors 120, 122 in the second bus controller slot 114. The first backplane connector 202 and the second backplane connector 204 may be any type of connector useful for electrically linking the card 200 to the backplane 100. In one embodiment, the first backplane connector 202 and the second backplane connector 204 are both 240 pin count connectors available from Berg-Metral, part number 73981-102. The physical configuration of the first backplane connector 202 and the second backplane connector 204 on the card 200 is determined by the physical positioning of the connectors 116, 118, 120, 122 in each bus controller slot 112, 114.

The first backplane connector 202 is electrically connected to a first host connector 206 on the card 200, where the first host connector 206 is adapted for connection to a host computer (not shown). Between the first backplane connector 202 and the first host connector 206, the card 200 may include one or more electrical components, depending on the particular configuration of the card 200. Preferably, where the first host connector 206 receives voltage-differential input or transmits voltage-differential output, and the buses 108, 110 are SCSI buses, the card 200 includes a first transceiver 212. The first transceiver 212 converts the voltage levels of differential signals to the voltage level of signals utilized on a single-ended bus. In one embodiment, the transceiver 212 is a 9-Channel Differential Transceiver from Texas Instruments, part number SN75976A. The first transceiver 212 is electrically connected to the first host connector 206. Such a card 200 also preferably includes a first terminator 210 associated with the first backplane connector 202, which is required at an end of a SCSI or other single-ended bus. In one embodiment, the terminator is a DS2108 terminator from Dallas Semiconductor. Further, such a card 200 also includes a first expander 208, used to electrically isolate and retime signals on the single-ended bus, such as SCSI signals. The first expander 208 preferably also isolates the buses 108, 100 on the backplane 100 from the circuitry on the card 200. The first expander 208 is preferably located between, and electrically connected to both, the first backplane connector 202 and the transceiver 212. In one embodiment, the first expander 208 is an integrated circuit from LSI Logic, part number SYM53C140. Together, the first host connector 206, the first transceiver 212, the first expander 208, and the first backplane connector 202 define a first signal path 250. Signals can travel in both directions along the first signal path 250.

Similarly, the second backplane connector 204 is electrically connected to a second host connector 214 on the card 200, where the second host connector 214 is adapted for connection to a host computer (not shown). Between the second backplane connector 204 and the second host connector 214, the card 200 preferably includes a second transceiver 213 and a second expander 209 located between, and electrically connected to both, the second backplane connector 204 and the second transceiver 213. The card 200 also includes a second terminator 211 associated with the second backplane connector 204. Together, the second host connector 214, the second transceiver 213, the second expander 209 and the second backplane connector 204 define a second signal path 260. Signals can travel in both directions along the second signal path 260.

Preferably, the card 200 includes a bridge 216. The bridge 216 provides a controllable connection between the first bus 108 and the second bus 110. In one embodiment, the bridge 216 is the same integrated circuit used as the expander 208, 209, and preferably connects both expanders 208, 209. However, the bridge 216 may connect the first bus 108 to the second bus 110 at a different location on the card 200.

A controller 218 is also included on the card 200. The controller 218 is electrically connected to the other components on the card 200, such as the backplane connectors 202, 204, the host connectors 206, 214, the transceivers 212, 213, the terminators 210, 211, the expanders 208, 209 and the bridge 216. The connection between the controller 218 and the other components on the card 200 is preferably made by connecting to the circuitry on the card 200 that is in place to interlink those components, but may be made directly to each component if desired. The controller 218 preferably receives signals from and transmits command signals to those components on the card 200. In one embodiment, the controller 218 is a PLD chip from Altera, part number EPF6016A0C208-2. While the components on the card 200 have been discussed as separate and discrete components, they may be combined as desired to form larger or different integrated circuits or electrical assemblies, if desired.

Figure 3:
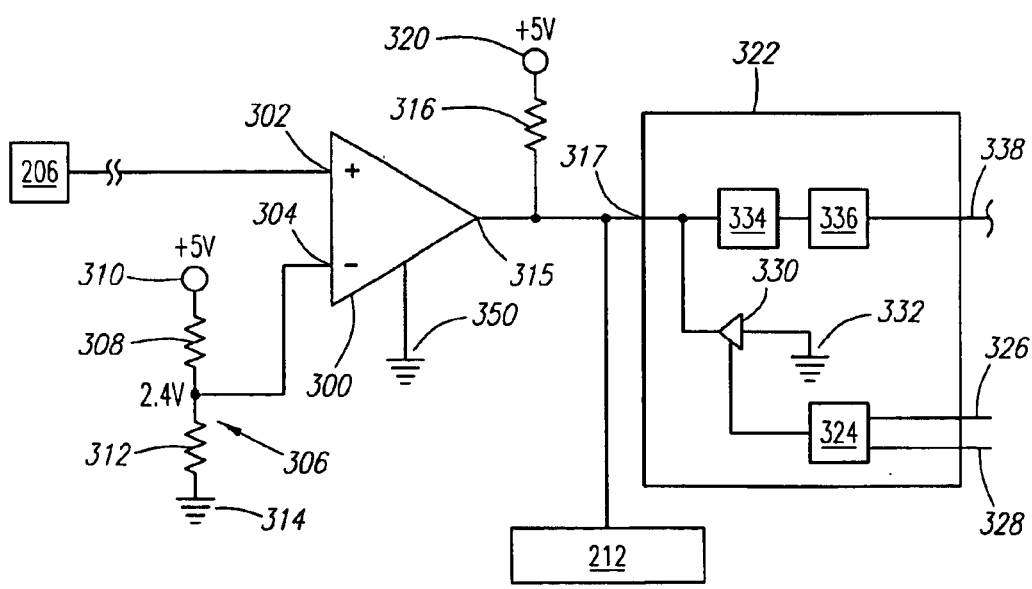
FIG. 3 is a schematic of a comparator, programmable logic device and HVD transceiver located on the bus controller card of FIG. 3.

Referring as well to FIG. 3, a standard comparator 300 has a noninverting input 302 and an inverting input 304. The noninverting input 302 is electrically connected to the first host connector 206, such that the noninverting input 302 receives a diffsense signal over the first host connector 206. The presence of a diffsense signal on a differential SCSI bus is standard. The inverting input 304 of the comparator 300 is connected to a voltage divider 306. The voltage divider 306 includes a first resistor 308, one terminal of which is connected to a voltage source 310, and a second resistor 312, one terminal of which is connected to the first resistor and the other terminal of which is connected to ground 314. The junction of the first resistor 308 and the second resistor 310 is connected to the inverting input 304 of the comparator 300. In one embodiment, the voltage source 310 provides voltage at +5 volts DC. Where the comparator 300 is used to detect a diffsense signal associated with an HVD SCSI bus, the first resistor 308 and the second resistor 312 are selected such that their resistance provides a voltage of substantially 2.4 volts at their junction, such that a voltage of substantially 2.4 volts is applied to the inverting input 304 of the comparator 300. As stated above, the diffsense signal of an HVD SCSI bus is typically at least a 2.4 volt signal, so the application of 2.4 volts to the inverting input 304 of the comparator 300 allows it to test for the presence of an HVD diffsense voltage of at least 2.4 volts at the noninverting input 302. The comparator output 315 outputs a signal resulting from the comparison of the voltage applied to the noninverting input 302 and the inverting input 304, as is described in greater detail below. In one embodiment, the comparator 300 is configured with the comparator output 315 in open collector form, which is standard. Thus, the comparator 300 includes a switched connection to ground 350, as is standard for an open-collector comparator 300. In one embodiment, the ground 350 is at the same level as, and/or physically connected to, the ground 314.

One terminal of a pullup resistor 316 is electrically connected to the comparator output 315. The use of a pullup resistor 316 in conjunction with an open-collector comparator 300 is standard in the art. The other terminal of the pullup resistor 316 is connected to a voltage source 320. The voltage source 320 preferably is set at +5 volts DC, corresponding to logic high. However, other voltages may be used if desired.

A programmable logic device (PLD) 322 has an interface 317 electrically connected to the terminal of the pullup resistor 316 that is additionally electrically connected to the comparator output 315. The interface 317 of the programmable logic device 322 is connected to the output of a tri-state buffer 330. The input of the tri-state buffer 330 is a ground 322, which in one embodiment is the same as the ground 314. The control terminal of the tri-state buffer 330 is electrically connected to transceiver disable logic 324. In one embodiment, the transceiver disable logic 324 includes one or more logic blocks in the PLD 322. The transceiver disable logic 324 is connected to one or more conductors for receiving signals relating to the operation of the first transceiver 212. In one embodiment, a first conductor 326 and a second conductor 328 are connected to the transceiver disable logic 324. In one embodiment, a signal relating to the power status of a host device connected to the first transceiver 212 is transmitted over the first conductor 326. When the host device is unpowered, a logic high signal is transmitted over the first conductor 326; when the host device is powered, no signal is transmitted over the first conductor 326. In the HVD10 device manufactured by Hewlett Packard, the term_power signal is carried over the first conductor 326. In one embodiment, a signal relating to the mismatch of DIP switches on different bus controller cards 200 is transmitted over the second conductor 328. When another bus controller card 200 on a common backplane 100 is configured differently through a set of DIP switches, a logic low signal is transmitted over the second conductor 326; when another bus controller card 200 is configured consistently, a logic high signal is transmitted over the second conductor 326. In the HVD10 device manufactured by Hewlett Packard, the dip_switch_mismatch signal is carried over the second conductor 328.

The first transceiver 212, or a particular pin thereon, is electrically connected to the interface 317 of the PLD 322 and to a terminal of the pullup resistor 316. That is, the first transceiver 212 is adapted to receive a diffsense prime signal. In one embodiment, the first transceiver 212 is an HVD transceiver, adapted to function in conjunction with an HVD SCSI bus. In one embodiment, if either the first conductor 326 or the second conductor 328 carries a logic high signal, the transceiver disable logic 324 transmits a signal to the control terminal of the tri-state buffer 330 such that the tri-state buffer 330 is enabled, pulling the lines associated with the tri-state buffer 330 output low. The interface 317 of the PLD 322 is pulled low, which in turn pulls the first transceiver 212 low. In response to the logic low, the first transceiver 212 switches off or remains off. Similarly, if neither the first conductor 326 nor the second conductor 328 carry a logic high signal, the transceiver disable logic 324 transmits a signal to the control terminal of the tri-state buffer 330 such that the tri-state buffer 330 enters a high-impedance state. As a result, the logic high voltage from the voltage source 320 pulls the lines associated with the pullup resistor 316 high. In response to the logic high, the first transceiver 212 turns on or remains on.

An input element 334 is connected to the output of the tri-state buffer 330 and to the interface 317. The input element 334 is preferably a buffer capable of driving signals within the PLD 322. The structure and use of such a buffer is standard. The input element 334 is connected in turn to expander enable logic 336. In one embodiment, the expander enable logic 336 includes one or more logic blocks in the PLD 322. In one embodiment, the expander enable logic 336 is connected to the first expander 208 via a conductor 338. In one embodiment, the expander enable logic 336 transmits a signal to the first expander 208 switching on or leaving on the first expander 208 when a logic high is received in the expander enable logic 336. Similarly, the expander enable logic 336 transmits a signal to the first expander 208 turning off or leaving off the first expander 208 when a logic low is received in the expander enable logic. In the HVD10 device manufactured by Hewlett Packard, the signal transmitted from the expander enable logic 336 to the first expander 208 is the expander_chip_ enable signal.

In one embodiment, the structure described above is duplicated on the bus controller card 200. The duplicate structure is as described above, where the second host connector 214 is substituted for the first host connector 206, and the second transceiver 213 is substituted for the first transceiver 212. In another embodiment, the same comparator 300 and programmable logic device 322 are used in conjunction with both the first backplane connector 202 and the second backplane connector 204, and with both the first transceiver 212 and the second transceiver 213.

The function of the comparator 300 and the programmable logic device 322 is best understood by example. As a first example, a diffsense signal is applied from the first backplane connector 202 to the noninverting input 302 of the comparator 300. The diffsense signal is at 2.5 volts, denoting that a SCSI bus connected to the first backplane connector 202 is an HVD SCSI bus. A voltage of 2.4 volts is applied to the inverting input 304 from the voltage divider 306. The comparator 300 compares the two voltages, determining that the voltage applied to the noninverting input 302 is greater than the voltage applied to the inverting input 304. As a result, no voltage is supplied to the base of the open collector, and the comparator output 315 is isolated from ground. As a result, the pullup resistor 316 is not provided a path to ground, and substantially no current flows across the pullup resistor 316. Because there is substantially no current flow across the pullup resistor 316, substantially no voltage is dissipated across it, so the voltage is substantially the same on both ends of the pullup resistor 316. That is, the voltage on both ends of the pullup resistor 316 is substantially equivalent to the voltage of the voltage source 320. In this example, neither the first conductor 326 nor the second conductor 328 carry a logic high signal, so as a result the tri-state buffer 330 enters or remains in a high impedance state. Thus, the voltage source 320 pulls the lines connected to the pullup resistor 316 high, such that the first transceiver 212 experiences a logic high. That is, the diffsense prime signal applied to the first transceiver 212 is logic high. The first transceiver 212 recognizes the high diffsense prime signal as corresponding to an HVD SCSI bus, and switches on or remains on. Similarly, logic high is asserted at the input element 334, which passes that logic high to the expander enable logic 336. The expander enable logic 336 senses that logic high, and transmits a signal to the first expander 208 switching it on or instructing it to remain on.

As a second example, a diffsense signal is applied from the first backplane connector 202 to the noninverting input 302 of the comparator 300. The diffsense signal is below 2.4 volts, denoting that a differential SCSI bus connected to the first backplane connector 202 is an LVD SCSI bus, or that there is no differential SCSI bus connected to the first backplane connector 202. In this example, the diffsense voltage is 1.1 volts, a voltage associated with an LVD SCSI bus. A voltage of 2.4 volts is applied to the inverting input 304 from the voltage divider 306. The comparator 300 compares the two voltages, determining that the voltage applied to the noninverting input 302 is less than the voltage applied to the inverting input 304. As a result, the comparator 300 switches to connect the comparator output 315 to the ground 350. Therefore, current travels from the voltage source 320 through the pullup resistor 316 to the ground 350. As current travels through the pullup resistor 316, voltage is dissipated. The resistance of the pullup resistor 316 is selected such that the voltage at its output is substantially 0.3 volts, which is a logic low. In this example, neither the first conductor 326 nor the second conductor 328 carry a logic high signal, such that the tri-state buffer 330 enters a high impedance state.

Thus, the voltage applied to the first transceiver 212 from the comparator output 315 is still substantially 0.3 volts, such that the diffsense prime signal applied to the first transceiver 212 is logic low. The first transceiver 212 is switched on or remains on only if a logic high diffsense prime signal is received. Therefore, the first transceiver 212 does not receive a diffsense prime signal corresponding to an HVD SCSI bus, and switches off or remains off, depending on its initial state. Further, expander enable logic 336 senses the absence of a logic high, and transmits a signal to the first expander 208 switching it off or instructing it to remain off. In another embodiment, the expander enable logic 336 ceases transmitting or continues not transmitting a signal to the expander 208 that enables its operation.

As a third example, a diffsense signal is applied from the first host connector 206 to the noninverting input 302 of the comparator 300. The diffsense signal is at 2.5 volts, denoting that a SCSI bus connected to the first host connector 206 is an HVD SCSI bus. A voltage of 2.4 volts is applied to the inverting input 304 from the voltage divider 306. The comparator 300 compares the two voltages, determining that the voltage applied to the noninverting input 302 is greater than the voltage applied to the inverting input 304. As a result, no voltage is supplied to the base of the open collector, and the comparator output 315 is isolated from ground.

In this example, the second conductor 328 carries a logic high signal to the transceiver disable logic 324, which then enables the tri-state buffer 330. The tri-state buffer 330 thus connects to ground 332, such that the lines electrically connected to the output of the tri-state buffer 330 are pulled low. Current travels through the pullup resistor 316 to ground 332, in the process dissipating voltage to the level of a logic low. As a result, a logic low is asserted at the first transceiver 212 as a diffsense prime signal. The first transceiver 212 recognizes the logic low diffsense prime signal as not corresponding to an HVD SCSI bus, and switches off or remains off. Further, the expander enable logic 336 senses the logic low, and transmits a signal to the first expander switching it on or instructing it to remain on. In another embodiment, the expander enable logic 336 ceases transmitting or continues not transmitting a signal to the expander 208 that enables its operation.

As can be seen, the PLD 326 manipulates the diffsense prime signal in order to switch the first transceiver 212 off and on. The examples above apply equally to any duplicate structure on the bus controller card 200 provided in association with the second backplane connector 204 and the second transceiver 214.

While the embodiments above have been described in terms of an HVD transceiver functioning with an HVD SCSI bus, other devices than the HVD transceiver may be switched on and off using the PLD 326 in conjunction with the comparator 300. Further, the transceiver may be an LVD transceiver, where the comparator 300 checks for the presence of a diffsense signal associated with an LVD SCSI bus.

Although the invention has been described with reference to particular embodiments, the description is only an example of the invention's application and should not be taken as a limitation. Consequently, various adaptations and combinations of features of the embodiments disclosed are within the scope of the invention as defined by the following claims and their legal equivalents.

What is claimed is:

1. A circuit for connection to a backplane connector interfacing with a bus, where the bus may carry a diffsense signal, and where the circuit may connect to a voltage source comprising:
   a comparator, comprising a comparator output configured as an open collector;
   a pullup resistor having two terminals, where one said terminal is connected to said comparator output and the other said terminal is connected to the voltage source; and
   a programmable logic device having an interface, said interface electrically connected to said terminal of said pullup resistor connected to said comparator output, whereby a diffsense prime signal is generated by the combination of said comparator output and said programmable logic device interface.

2. The circuit of claim 1, wherein said comparator comprises:
   a noninverting input connected to the backplane connector, wherein the diffsense signal is applied to said noninverting input;
   an inverting input, wherein a substantially fixed voltage is applied to said inverting input; and a switchable connection to ground.

3. The circuit of claim 1, wherein said programmable logic device comprises:
   a tri-state buffer having an input, an output and a control terminal, wherein said output of said buffer is connected to said interface and said input is connected to ground; and transceiver disable logic connected to said control terminal of said tri-state buffer.

4. The circuit of claim 3, further comprising at least one conductor electrically connected to said transceiver disable logic, whereby at least one signal can be transmitted to said transceiver disable logic.

5. The circuit of claim 3, further comprising:
an input element connected to said output of said tri-state buffer; and
expander enable logic electrically connected to said input element.

6. The circuit of claim 5, further comprising an expander, wherein said expander enable logic is electrically connected to said expander.

7. The circuit of claim 1, wherein said voltage source is at logic high voltage.

8. The circuit of claim 7, wherein said voltage source is substantially at five volts.

9. The circuit of claim 1, further comprising a voltage divider connected to said inverting input of said comparator, wherein said voltage divider applies said substantially fixed voltage to said inverting input.

10. The circuit of claim 1, wherein said substantially fixed voltage applied to said inverting input of said comparator is substantially 2.4 volts.

11. The circuit of claim 1, further comprising a transceiver electrically connected to said interface of said programmable logic device and to said terminal of said pullup resistor connected to said comparator output.

12. A bus controller card for use with a backplane having a bus controller slot connected to a bus, comprising:
a backplane connector, wherein said backplane connector is detachably connected to said bus controller slot;
a controller electrically connected to said backplane connector, said controller comprising
a comparator, comprising
a noninverting input connected to the backplane connector, wherein the diffsense signal is applied to said noninverting input,
an inverting input, wherein a substantially fixed voltage is applied to said inverting input, and
a comparator output configured as an open collector;
a pullup resistor having two terminals, where one said terminal is connected to said comparator output and the other said terminal is connected to the voltage source; and
a programmable logic device comprising
an interface electrically connected to said terminal of said pullup resistor connected to said comparator output,
a tri-state buffer having an input, an output and a control terminal, wherein said output of said buffer is connected to said interface and said input is connected to ground,
transceiver disable logic connected to said control terminal of said tri-state buffer,
an input element connected to said output of said tri-state buffer, and
expander enable logic electrically connected to said input element;
an expander electrically connected to said expander enable logic; and
a high voltage differential transceiver electrically connected to said interface of said programmable logic device and to said terminal of said pullup resistor connected to said comparator output, whereby a diffsense prime signal is generated by the combination of said comparator output and said programmable logic device interface.

13. A method for controlling a device connected to a bus, comprising:
checking for a diffsense signal from the bus;
comparing the diffsense signal to a reference voltage;
generating a diffsense prime signal based on said comparing;
selectively modifying said generated diffsense prime signal;
transmitting said selectively modified diffsense prime signal to the device; and
switching the device off in response to asserting said diffsense prime signal low.

14. A method for controlling a device comprising:
determining whether a diffsense signal on a bus is within a specified diffsense voltage range associated with a differential bus;
generating a diffsense prime signal based on the determination;
selectively modifying the diffsense prime signal; and
selectively activating and deactivating the device based on the modified diffsense prime signal.

15. The method according to claim 14 further comprising:
determining whether a diffsense signal on a bus is within a voltage range associated with a high-voltage differential (HVD) small computer systems interface (SCSI) bus.

16. The method according to claim 14 wherein:
the device is a high-voltage differential (HVD) transceiver.

* * * * *

UNITED STATES PATENT AND TRADEMARK OFFICE
CERTIFICATE OF CORRECTION

PATENT NO. : 7,068,073 B2  Page 1 of 1
APPLICATION NO. : 09/811192
DATED : June 27, 2006
INVENTOR(S) : Anthony J. Benson It is certified that error appears in the above-identified patent and that said Letters Patent is hereby corrected as shown below:

On the Title page, in Item (56), under "Foreign Patent Documents", in column 2, line 1, delete "DE" and insert -- EP --, therefor.

Signed and Sealed this

Twenty-eighth Day of April, 2009

JOHN DOLL
*Acting Director of the United States Patent and Trademark Office*